United States Patent
Li et al.

(10) Patent No.: US 11,551,374 B2
(45) Date of Patent: Jan. 10, 2023

(54) HAND POSE ESTIMATION FROM STEREO CAMERAS

(71) Applicant: Snap Inc., Santa Monica, CA (US)

(72) Inventors: Yuncheng Li, Los Angeles, CA (US); Jonathan M. Rodriguez, II, Los Angeles, CA (US); Zehao Xue, Los Angeles, CA (US); Yingying Wang, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/015,819

(22) Filed: Sep. 9, 2020

(65) Prior Publication Data

US 2021/0074016 A1 Mar. 11, 2021

Related U.S. Application Data

(60) Provisional application No. 62/897,669, filed on Sep. 9, 2019.

(51) Int. Cl.
| | |
|---|---|
| *G06T 7/73* | (2017.01) |
| *G06T 7/20* | (2017.01) |
| *G06F 3/01* | (2006.01) |
| *H04N 13/204* | (2018.01) |

(Continued)

(52) U.S. Cl.
CPC ................ *G06T 7/73* (2017.01); *G06F 3/011* (2013.01); *G06K 9/6256* (2013.01); *G06T 7/20* (2013.01); *G06V 40/11* (2022.01); *H04N 13/204* (2018.05); *G06T 2207/10012* (2013.01); *G06T 2207/20081* (2013.01); *G06T 2207/20084* (2013.01);

(Continued)

(58) Field of Classification Search
CPC .... G06K 9/342; G06K 9/6271; G06K 9/6256; G06K 9/00382; G06T 2207/20084; G06T 2207/30196; G06T 7/73; G06T 2207/20081; G06T 2207/10012; G06T 7/20; G06T 2207/20132; H04N 5/23222; H04N 13/204; H04N 2013/0081; G06F 3/011; G06F 3/017
See application file for complete search history.

(56) References Cited

U.S. PATENT DOCUMENTS

| | | |
|---|---|---|
| 7,971,156 B2 | 6/2011 | Albertson et al. |
| 7,996,793 B2 | 8/2011 | Latta et al. |
| 8,487,938 B2 | 7/2013 | Latta et al. |

(Continued)

FOREIGN PATENT DOCUMENTS

| | | | |
|---|---|---|---|
| CN | 103049761 B | | 8/2016 |
| CN | 112801061 A | * | 5/2021 |

(Continued)

OTHER PUBLICATIONS

"International Application Serial No. PCT/US2020/070515, International Search Report dated Dec. 17, 2020", 3 pgs.

(Continued)

*Primary Examiner* — Pinalben Patel
(74) *Attorney, Agent, or Firm* — Schwegman Lundberg & Woessner, P.A.

(57) ABSTRACT

Systems and methods herein describe using a neural network to identify a first set of joint location coordinates and a second set of joint location coordinates and identifying a three-dimensional hand pose based on both the first and second sets of joint location coordinates.

18 Claims, 8 Drawing Sheets

(51) Int. Cl.
*G06K 9/62* (2022.01)
*G06V 40/10* (2022.01)

(52) U.S. Cl.
CPC ............... *G06T 2207/20132* (2013.01); *G06T 2207/30196* (2013.01)

(56) References Cited

U.S. PATENT DOCUMENTS

| | | |
|---|---|---|
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,261,595 B1 | 4/2019 | Kin |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2009/0012788 A1 | 1/2009 | Gilbert et al. |
| 2011/0301934 A1 | 12/2011 | Tardif |
| 2013/0230211 A1* | 9/2013 | Tanabiki ................. G06T 7/75 382/103 |
| 2014/0171036 A1 | 6/2014 | Simmons |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0185141 A1 | 6/2017 | Shotton et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2017/0371403 A1* | 12/2017 | Wetzler .................... G06K 9/78 |
| 2018/0024641 A1* | 1/2018 | Mao .................. G06K 9/00389 382/103 |
| 2018/0032840 A1* | 2/2018 | Yu ........................ G06K 9/6267 |
| 2018/0047175 A1* | 2/2018 | Wang ........................ G06T 7/11 |
| 2018/0158370 A1 | 6/2018 | Pryor |
| 2018/0260039 A1* | 9/2018 | Sainton .................... G06T 7/73 |
| 2018/0329509 A1 | 11/2018 | Horowitz |
| 2018/0338710 A1* | 11/2018 | Tas .................... G06K 9/00268 |
| 2019/0180473 A1 | 6/2019 | Guleryuz |
| 2020/0050342 A1* | 2/2020 | Lee ........................ G06F 17/16 |
| 2020/0184721 A1* | 6/2020 | Ge ........................ G06N 3/0454 |
| 2021/0011612 A1 | 1/2021 | Dancie et al. |
| 2021/0166732 A1 | 6/2021 | Shaburova et al. |
| 2021/0174034 A1 | 6/2021 | Retek et al. |
| 2021/0174519 A1* | 6/2021 | Bazarevsky ........... G06V 40/28 |
| 2021/0241529 A1 | 8/2021 | Cowburn et al. |
| 2021/0275107 A1* | 9/2021 | Pitters .................... A61B 5/112 |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |

FOREIGN PATENT DOCUMENTS

| | | |
|---|---|---|
| CN | 114391160 A | 4/2022 |
| EP | 3707693 A1 | 9/2020 |
| WO | WO-2016168591 A1 | 10/2016 |
| WO | WO-2019094618 A1 | 5/2019 |
| WO | 2021051131 | 3/2021 |

OTHER PUBLICATIONS

"International Application Serial No. PCT/US2020/070515, Written Opinion dated Dec. 17, 2020", 4 pgs.

Panteleris, Paschalis, "Back to RGB: 3D tracking of hands and hand-object interactions based on short-baseline stereo", arXiv preprint, arXiv:1705.05301v1 [cs.CV], (May 15, 2017), 10 pgs.

Zhang, Jiawei, "3D Hand Pose Tracking and Estimation Using Stereo Matching", arXiv preprint, arXiv:1610.07214v1 [cs.CV], (Oct. 23, 2016), 11 pgs.

"International Application Serial No. PCT/US2020/070515, International Preliminary Report on Patentability dated Mar. 17, 2022", 6 pgs.

* cited by examiner

HAND POSE ESTIMATION FROM STEREO CAMERAS

CLAIM OF PRIORITY

This application claims the benefit of priority to U.S. Provisional Application Ser. No. 62/897,669, filed on Sep. 9, 2019, which is incorporated herein by reference in its entirety.

TECHNICAL FIELD

Embodiments of the present disclosure relate generally to three-dimensional hand pose estimation. More particularly, but not by way of limitation, the present disclosure addresses systems and methods for full three-dimensional hand pose estimation using stereo cameras.

BACKGROUND

Three-dimensional hand pose tracking has many applications in human computer interaction, video games, sign language recognition, and augmented reality, for example.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The following paragraphs describe an end-to-end approach to estimate full three-dimensional (herein referred to as "3D") hand poses from stereo cameras. A 3D hand pose may be defined based on the joint locations within the hand. The joint locations referred to herein may describe a point or articulation, (e.g., a connection) between two or more bones that allow for motion. The proposed neural network architecture leverages a large-scale synthetic dataset composed of stereo image pairs and ground truth three-dimensional hand pose annotations. One aspect of the present disclosure describes a system for estimating three-dimensional hand poses from stereo cameras. Although the description of the system below refers to stereo cameras, the system may be configured to use one or more cameras.

The system receives a pair of images of a hand pose from a stereo camera, in some examples, the system may receive a sequence of images (e.g., a video with multiple image frames). The system crops the portion of each image including the hand. For example, the system removes portions of the image not including the hand such that the cropped image is primarily comprised of pixels representing the hand. The system may analyze multiple hand poses in a single image. For example, the system may crop each hand within the image. Thus, a single image may be cropped into multiple images, wherein each cropped image contains a hand pose.

The system analyzes the cropped image by using a neural network trained to identify joint locations within the hand. In some examples, the system performs the cropping operation to ensure that the neural network is not provided with irrelevant image data with few or none hand pixels.

Figure 1:
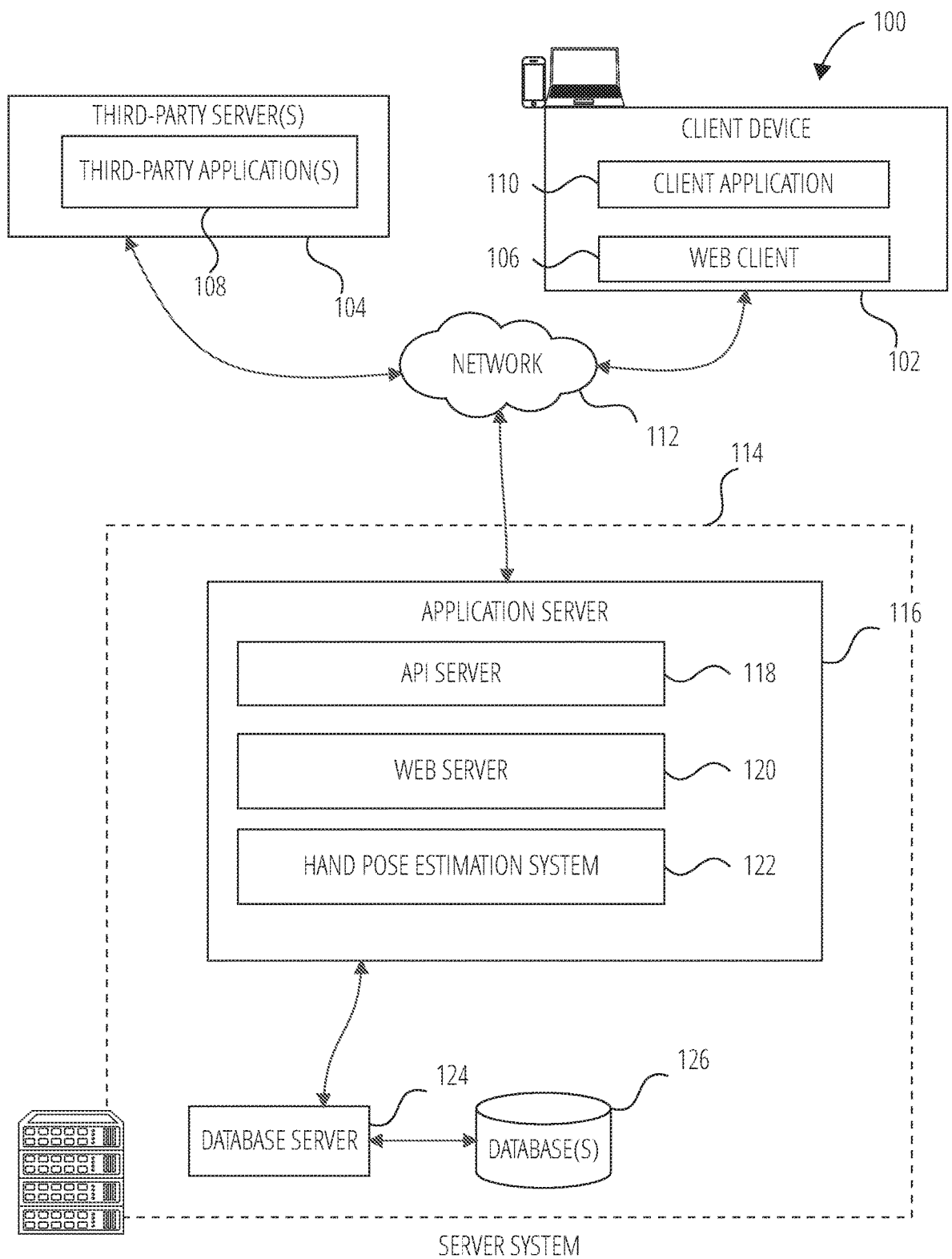
FIG. 1 is a diagrammatic representation of a networked environment in which the present disclosure may be deployed, in accordance with some example embodiments.

In some examples, the system further identifies the three-dimensional hand position based on the joint locations. For example, the system may compare the joint locations to a predefined dataset of joint locations to identify the 3D hand pose. FIG. 1 is a block diagram showing an example system 100, according to some example embodiments, configured to automatically perform three-dimensional hand pose estimation. The system 100 includes one or more client devices such as client device 102. The client device 102 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some embodiments, the client device 102 comprises a display module (not shown) to display information (e.g., in the form of user interfaces). In further embodiments, the client device 102 comprises one or more of touch screens, accelerometers, gyroscopes, cameras, microphones, global positioning system (GPS) devices, wearable devices, and so forth. The client device 102 may be a device of a user that is used to capture a pair of stereo images. For example, the client device 102 may be used to identify a three-dimensional hand pose using the captured pair of stereo images.

For example, client device 102 is a device of a given user who would like to capture a pair of images using a stereo camera coupled to the client device 102. The user captures a pair of images using a stereo camera of a three-dimensional hand pose. Server system 114 receives the image and identifies the three-dimensional hand pose.

In some examples the identified three-dimensional hand pose causes the client device 102 to perform a predefined action. For example, upon identifying a 3D hand pose, the client device 102 may be prompted to capture an image, modify a captured image (e.g., annotate the captured image), annotate an image in real-time or near real-time, transmit a message via one or more applications (e.g., third-party application(s) 108, client application 110), or navigate menus within one or more applications (e.g., third-party application(s) 108, client application 110). The identified 3D hand pose may optionally be used to interact with augmented reality (AR) experiences using the client device 102. It is understood that the examples listed above are not intended to be a limiting list of examples.

One or more users may be a person, a machine, or other means of interacting with the client device 102. In example embodiments, the user may not be part of the system 100 but may interact with the system 100 via the client device 102 or other means. For instance, the user may provide input (e.g., touch screen input or alphanumeric input) to the client device 102 and the input may be communicated to other entities in the system 100 (e.g., third-party server(s) 104, server system 114, etc.) via the network 112. In this instance, the other entities in the system 100, in response to receiving the input from the user, may communicate information to the client device 102 via the network 104 to be presented to the user. In this way, the user interacts with the various entities in the system 100 using the client device 102.

The system 100 further includes a network 112. One or more portions of network 112 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 102 may access the various data and applications provided by other entities in the system 100 via web client 106 (e.g., a browser) or one or more client application 110. The client device 102 may include one or more client application(s) 110 (also referred to as "apps") such as, but not limited to, a web browser, messaging application, electronic mail (email) application, an e-commerce site application, a mapping or location application, and the like.

In some embodiments, one or more client application(s) 110 are included in a given one of the client device 110, and configured to locally provide the user interface and at least some of the functionalities, with the client application(s) 110 configured to communicate with other entities in the system 100 (e.g., third-party server(s) 104, server system 114, etc.), on an as-needed basis, for data processing capabilities not locally available. Conversely, one or more client application (s) 110 may not be included in the client device 102, and then the client device 102 may use its web browser to access the one or more applications hosted on other entities in the system 100 (e.g., third-party server(s) 104, server system 114, etc.

A server system 114 provides server-side functionality via the network 112 (e.g., the Internet or wide area network (WAN)) to: one or more third-party server(s) 104, and one or more client device 102. The server system 114 includes an Application Program Interface (API) Server 118, a web server 120, and a hand pose estimation system 122, that may be communicatively coupled with one or more database(s) 126. The one or more database(s) 126 may be storage devices that store data related to users of the server system 114, applications associated with the server system 114, cloud services, user data, and so forth. The one or more database(s) 126 may further store information related to third-party server(s) 104, third-party application(s) 108, client device 102, client application 110, users, and so forth. In one example, the one or more database(s) 126 may be cloud-based storage.

The server system 114 may be a cloud computing environment, according to some example embodiments. The server system 114, and any servers associated with the server system 114, may be associated with a cloud-based application, in one example embodiment.

The server system 114 includes a hand pose estimation system 122. The hand pose estimation system 122 may include one or more servers and may be associated with a cloud-based application. The hand pose estimation system 122 may obtain stereo images from database(s) 126. In some examples, the hand pose estimation system 122 may capture stereo images using the client device 102. The hand pose estimation system 122 analyzes three-dimensional hand poses captured in stereo images and identifies the hand pose based on joint locations within the hand. The details of the hand pose estimation system 122 are provided below in connection with FIG. 3.

The system 100 further includes one or more third-party server(s) 104. The one or more third-party server(s) 104 may include one or more third-party application(s) 108. The one or more third-party application(s) 108, executing on third-party server(s) 104 may interact with the server system 114 via API Server 118 via a programmatic interface provided by the API Server 118. For example, one or more the third-party application(s) 108 may request and utilize information from the server system 114 via the API Server 118 to support one or more features or functions on a website hosted by the third party or an application hosted by the third party. The third-party application(s) 108, for example, may provide software version analysis functionality that is supported by relevant functionality and data in the server system 114.

Figure 2:
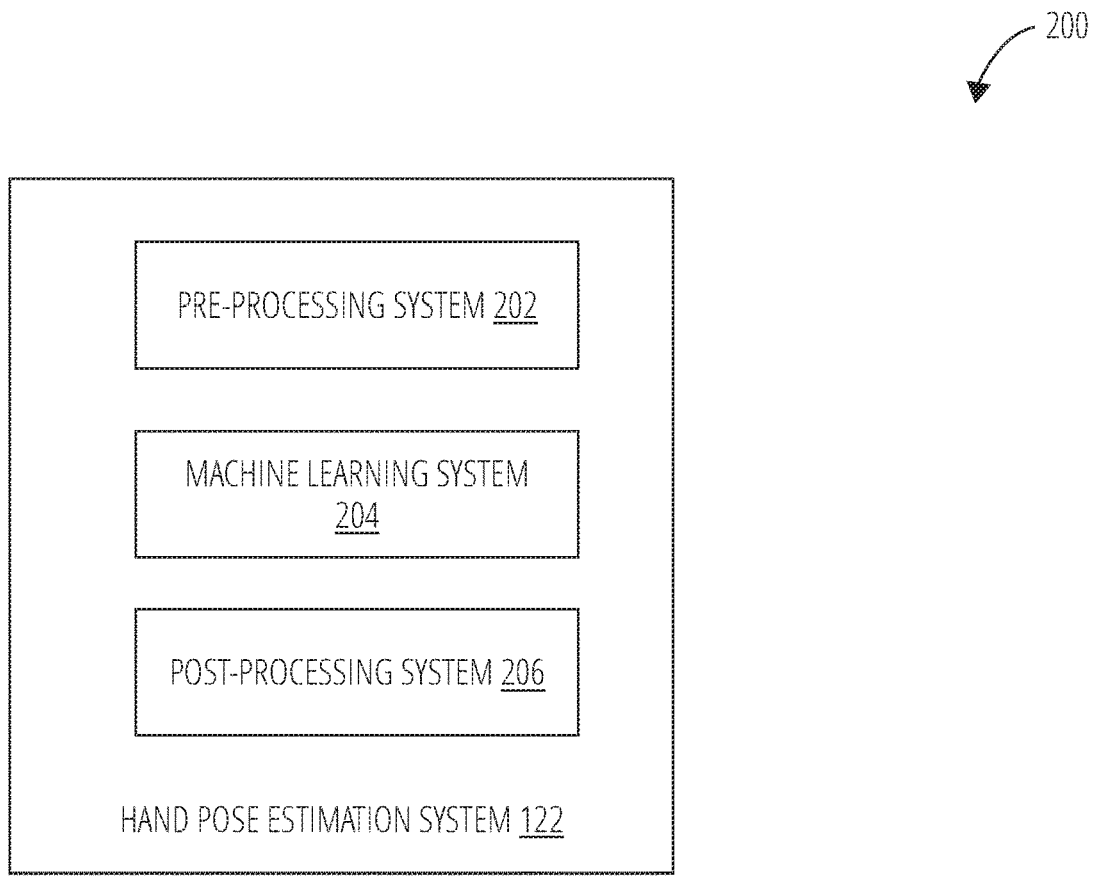
FIG. 2 is a block diagram of a hand pose estimation system according to some example embodiments.

FIG. 2 is a block diagram of a hand pose estimation system 122 according to some example embodiments. The hand pose estimation system 122 is shown as including a pre-processing system 202, a machine learning system 204 and a post-processing system 206, all configured to communicate with each other (e.g., via bus, shared memory, or a switch). Any one or more of these systems may be implemented using one or more processors (e.g., by configuring such one or more processors to perform functions described for that system and hence may include one or more processors).

Any one or more of the systems described may be implemented using hardware alone (e.g., one or more of the processors of a machine) or a combination of hardware and software. For example, any system described of the hand pose estimation system 122 may physically include an arrangement of one or more of the processors (e.g., a subset of or among the one or more processors of the machine) configured to perform the operations described herein for that system. As another example, any system of the hand pose estimation system 122 may include software, hardware, or both, that configure an arrangement of one or more processors (e.g., among the one or more processors of the machine) to perform the operations described herein for that system. Accordingly, different systems of the hand pose estimation system 122 may include and configure different arrangements of such processors or a single arrangement of such processors at different points in time. Moreover, any two or more systems of the hand pose estimation system 122 may be combined into a single system, and the functions described herein for a single system may be subdivided among multiple systems. Furthermore, according to various example embodiments, systems described herein as being implemented within a single machine, database, or device may be distributed across multiple machines, databases, or devices.

In one example, the pre-processing system 202 receives a pair of images from a stereo camera. The pre-processing system 202 identifies a region within each of the images containing a hand. The pre-processing system 202 further crops the region within each image containing the hand. Each image may contain multiple hands. The pre-processing system 202 crops each region within the image containing a hand. In some examples, the pre-processing system 202 uses a tracking system to identify the location of a hand within each image. In some examples, the pre-processing system 202 uses the estimation of the location of the hand in a previous frame to generate an estimation of the location of the hand for a successive frame. For example, the pre-processing system 202 may prompt a user of the hand pose estimation system 122 to place his or her hand in an initialization position. The initialization position may be designated as a bounded region displayed on a graphical user interface of a user device. The pre-processing system 202 may request the user to place his or her hand within the bounded region. The pre-processing system 202 may use the location of the hand in the initialization position to estimate the location of the hand in successive image frames.

In some examples, the machine learning system 204 is configured to identify a three-dimensional hand pose using joint locations within the hand. In some examples the machine learning system 204 computes joint location coordinates relative to the cropped image generated by the pre-processing system 202. For example, the pre-processing system 202 provides the cropped image to the machine learning system 204 to ensure that the machine learning system 204 is not provided with irrelevant image data with few or none hand pixels. In some examples, the machine learning system 204 generates a synthetic dataset used for training a neural network. The trained neural network is deployed on a client device to perform real-time three-dimensional hand pose estimation. More details regarding the machine learning system 204 are described below in relation to FIG. 3.

In one example, the post-processing system 206 retrieves the joint location coordinates in the hand as computed by the machine learning system 204. The post-processing system 206 converts the joint location coordinates computed by the machine learning system 204 to estimate joint location coordinates in the three-dimensional world space. In some examples, the post-processing system 206 denormalizes the previously computed joint location coordinates by converting a first set of joint location coordinates relative to the cropped image, to a third set of joint location coordinates relative to an uncropped version of the image (e.g., the received stereo image). The post-processing system 206 further converts the third set of joint location coordinates to estimate the joint location coordinates in the world space. Therefore, the post-processing system 206 retrieves the joint location coordinates in the hand relative to the cropped image and converts the joint location coordinates to the three-dimensional world space. In some examples, the joint location coordinates in the world space are represented by millimeters. In some examples, the joint location coordinates relative to the cropped image and the uncropped images are represented by pixel locations (e.g., image space).

Figure 3:
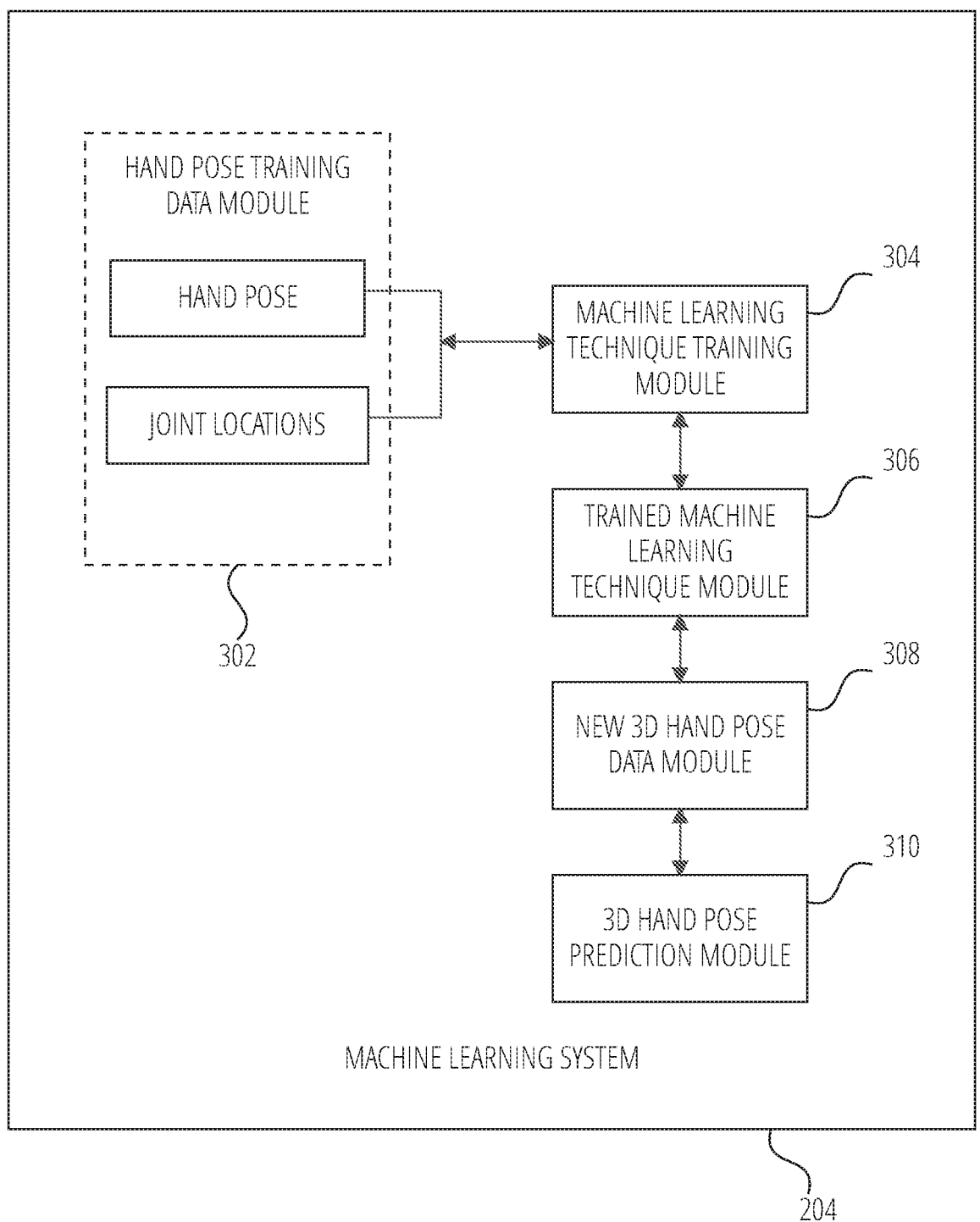
FIG. 3 illustrates a machine learning system according to some example embodiments.

FIG. 3 illustrates a machine learning system 204 according to some example embodiments. The machine learning system 204 includes a new 3D hand pose data module 308, a machine learning technique training module 304, a trained machine learning technique module 306, a new 3D hand pose data module 308, and a 3D hand pose prediction module 310.

In some implementations, some modules of machine learning system 204 may be implemented on server system 114 and others may be implemented on third-party server(s) 104. In some implementations, all of the modules of machine learning system 204 are implemented on server system 114 or on third party third-party server(s) 104. In such cases, server system 114 communicates information to third party third-party server(s) 104 based on the modules implemented and vice versa.

The hand pose training data module 302 is generated by the machine learning system 204. In some examples, the hand pose training data module 302 may comprise a synthetic dataset. For example, the hand pose training data module 302 may render various hand poses on a virtual stereo camera. Each hand pose image is associated with a ground truth label (e.g., joint locations in the hand). The hand pose training data module 302 may store each of the rendered hand pose images and their corresponding ground truth labels in one or more database(s) 126. The hand pose training data module 302 may diversify its dataset by using hands of different skin colors, hand shapes and an assortment of hand gestures.

The machine learning technique training module 304 is trained to estimate the joint locations within a hand by establishing a relationship between the hand pose images and the corresponding ground truth label (e.g., joint locations in the hand) provided by the hand pose training data module 302.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for predicting a days to pending amount for a given property.

The machine-learning algorithms utilize features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes, such as the days to pending amount.

Once the training data are collected and processed, the machine learning technique training module 304 can be built using machine learning techniques. Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some embodiments, the machine learning technique training module 304 is trained to estimate joint locations within a hand based on one or more features (e.g., training data received from the hand pose training data module 302). In some embodiments the machine learning system 204 may train the machine learning technique training module 304 on a periodic basis (e.g., weekly, monthly, annually).

After being trained, the machine learning technique training module 304 is provided to the trained machine learning technique module 306. The trained machine learning technique module 306 is configured to receive new three-dimensional hand pose image data from new 3D hand pose data module 308. For example, the new 3D hand pose data module 308 receives a pair of stereo images captured by a user containing a hand pose. The new 3D hand pose data module 308 instructs the trained machine learning technique module 306 to apply the trained machine learning technique to the pair of stereo images provided by the new 3D hand pose data module 308. The trained machine learning technique module 306 provides and estimate of joint locations within the hand based on the pair of stereo images of the hand provided by the new 3D hand pose data module 308.

In some examples, the trained machine learning technique module 306 provides the estimated joint locations within the hand to the 3D hand pose prediction module 310. The 3D hand pose prediction module 310 may determine the type of three-dimensional hand pose based on the estimated joint locations.

Figure 4:
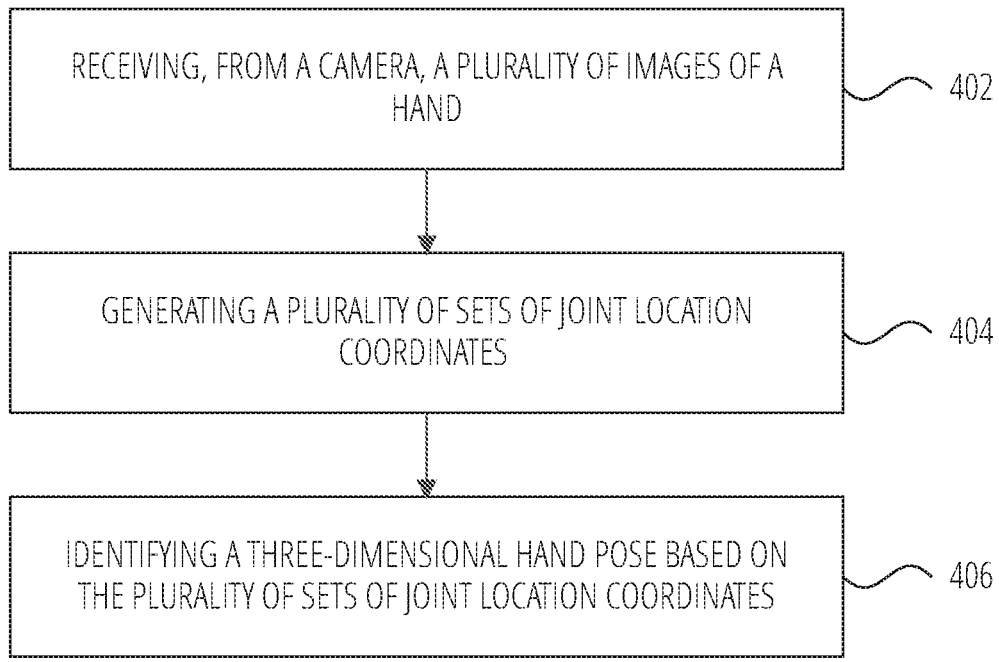
FIG. 4 is a flow diagram of a method for automatically identifying a hand pose according to some example embodiments.

FIG. 4 illustrates a flow diagram of processes 402, 404, and 406 for automatically identifying a three-dimensional hand pose. The processes may be embodied in computer-readable instructions for execution by one or more processors such that the operations of the processes may be performed in part or in whole by the functional components of the server system 114; accordingly, the processes are described below by way of example with reference thereto. However, in other embodiments at least some of the operations of the processes may be deployed on various other hardware configurations. The processes are therefore not intended to be limited to the server system 114 and can be implemented in whole, or in part, by any other component.

At operation 402, the hand pose estimation system 122 receives a pair of images from a camera. In some examples, the camera is a stereo camera. The pair of images comprise a first view and a second view of a hand. In some examples the first view of the hand replicates a left eye view of the hand and the second view of the hand replicates a right eye view of the hand. In some examples, each camera in the stereo camera may be configured in positions different from left and right eye viewpoints. The first view of the hand comprises a first location of the hand within the first view and the second view of the hand comprises a second location of the hand within the second view. The first location and the second location of the hand may be horizontally or vertically disparate. For example, a single joint location that appears at a horizontal coordinate p in a first view may be present a second horizontal coordinate p-3 in the second view. In some examples, operation 402 is performed on a wearable client device 102 (e.g., a head-mounted image capture device with a cameras mounted on a left and right temple).

At operation 404, the hand pose estimation system 122 generates a plurality of sets of joint location coordinates. In some examples, the hand pose estimation system 122 identifies a first set of joint location coordinates and generates a second set of joint locations coordinates using the first set of joint location coordinates. Further details of operation 404 are described below in connection with FIG. 5.

In operation 406, the hand pose estimation system 122 identifies a 3D hand pose based on the plurality of sets of joint location coordinates. The hand pose estimation system 122 may compare the identified joint locations to a predefined dataset of joint locations. For example, the hand pose estimation system 122 may determine that the hand pose is a "thumbs-up" pose based on the joint locations within the hand.

Figure 5:
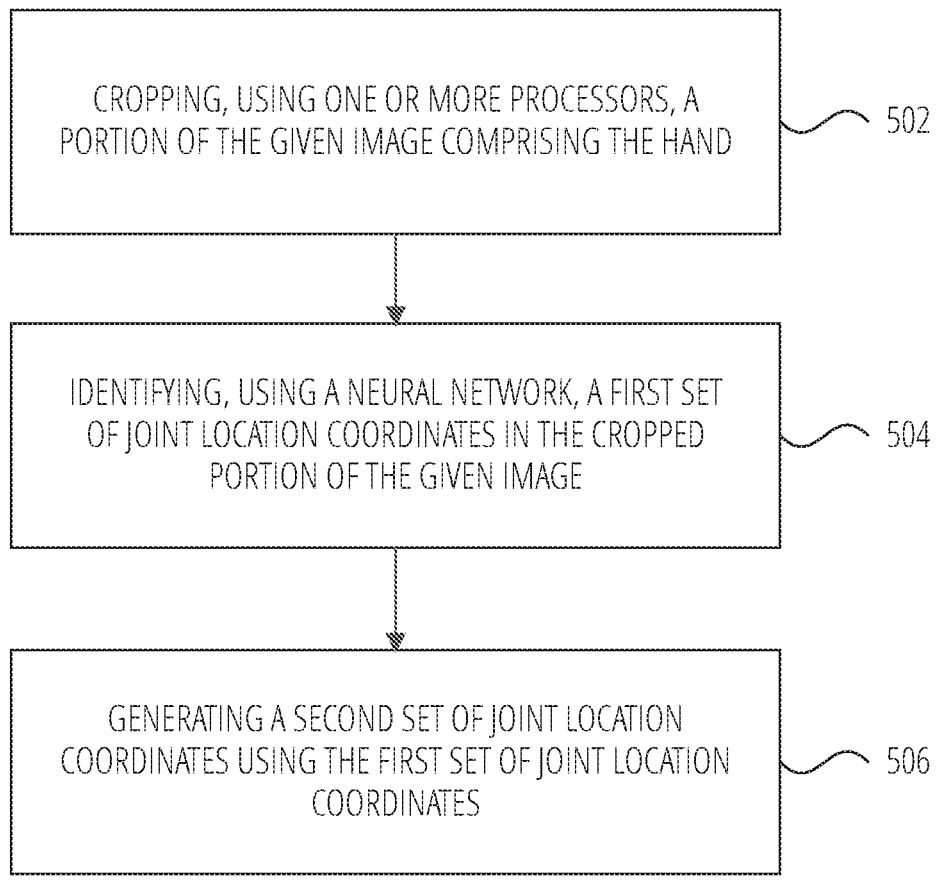
FIG. 5. Is a flow diagram of a method for automatically identifying a hand pose according to some example embodiments.

FIG. 5 is a flow diagram illustrating an example method for generating a plurality of sets of joint location coordinates. In some examples, operations 502, 504, and 506 may be performed as part of operation 404. In some examples, 502, 504, and 506 may be performed for each image in a pair of stereo images. In operation 502, the hand pose estimation system 122 crops, using one or more processors, a portion of the given image comprising the hand. Operation 502 may be performed by the pre-processing system 202 as described above in relation to FIG. 2.

In operation 504, the hand pose estimation system 122 identifies, using a neural network, a first set of joint location coordinates in the cropped portion of the given image. In some examples the first set of joint location coordinates represent joint locations of the hand pose in the image space. The image space may refer to pixel locations in the image. For example, the first set of joint location coordinates may be represented in terms of pixel locations in the cropped image. The pixel locations in the cropped image may be represented using a Cartesian coordinate system.

In some examples, the neural network is a convolutional neural network that computes the two-dimensional joint location estimation and disparity on different joints between each image in the pair of images, separately. The neural network may compute feature maps for each image in the stereo image pair and combine features from both images to obtain the relative disparity. The relative disparity refers to the distance between two corresponding points (e.g., joint locations) in a first and second image of a stereo image pair. Operation 504 may be performed by the machine learning system 204 as described above in relation to FIG. 2.

In operation 506, the hand pose estimation system 122 generates a second set of joint location coordinates using the first set of joint location coordinates. In some examples the second set of joint location coordinates represent joint location of the hand pose in physical space (e.g., world space). The world space may be measured using millimeters. For example, the second set of joint location coordinates may be represented in terms of millimeters in the actual physical space. The physical space may be represented using a Cartesian coordinate system. In some examples, operation 506 is performed by the post-processing system 206.

In one example, the first set of joint location coordinates is converted to a third set of joint location coordinates. The third set of joint location coordinates may be computed relative to an uncropped version of the image (e.g., the received stereo images). The third set of joint location coordinates relative to the uncropped version of the image may subsequently be converted to the second set of joint location coordinates.

Figure 6:
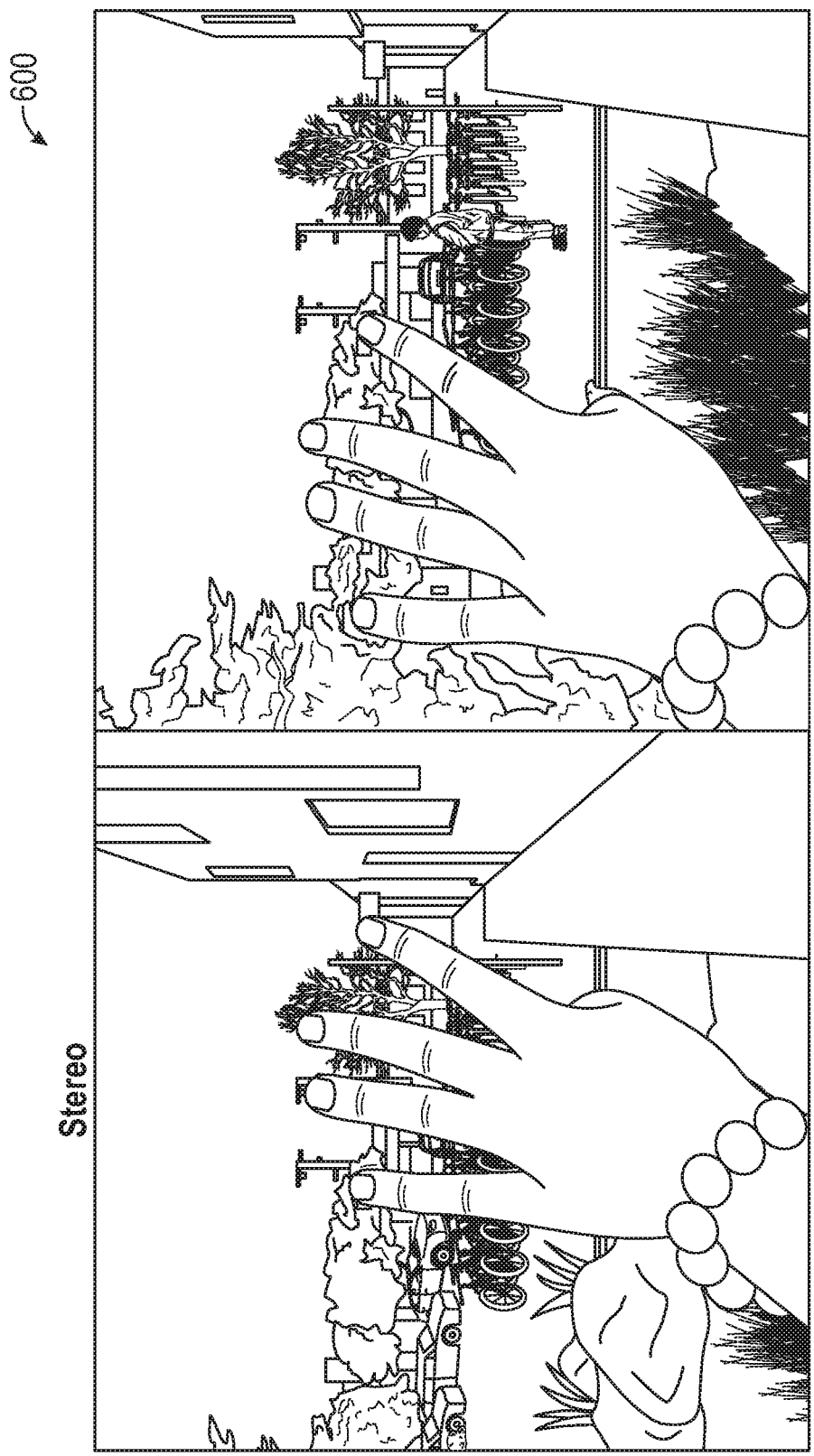
FIG. 6 is an illustration of a stereo image pair of a three-dimensional hand pose according to some example embodiments.

FIG. 6 is an illustration of a stereo image pair of a three-dimensional hand pose according to some example embodiments. In some examples, the stereo image pair is captured by a head-mounted image capture device with cameras mounted on a left and right temple. The hand pose estimation system 122 analyzes the captured images and identifies joint locations in the hand. The hand pose estimation system 122 further uses the identified joint locations in the hand to identify the three-dimensional hand pose.

Figure 7:
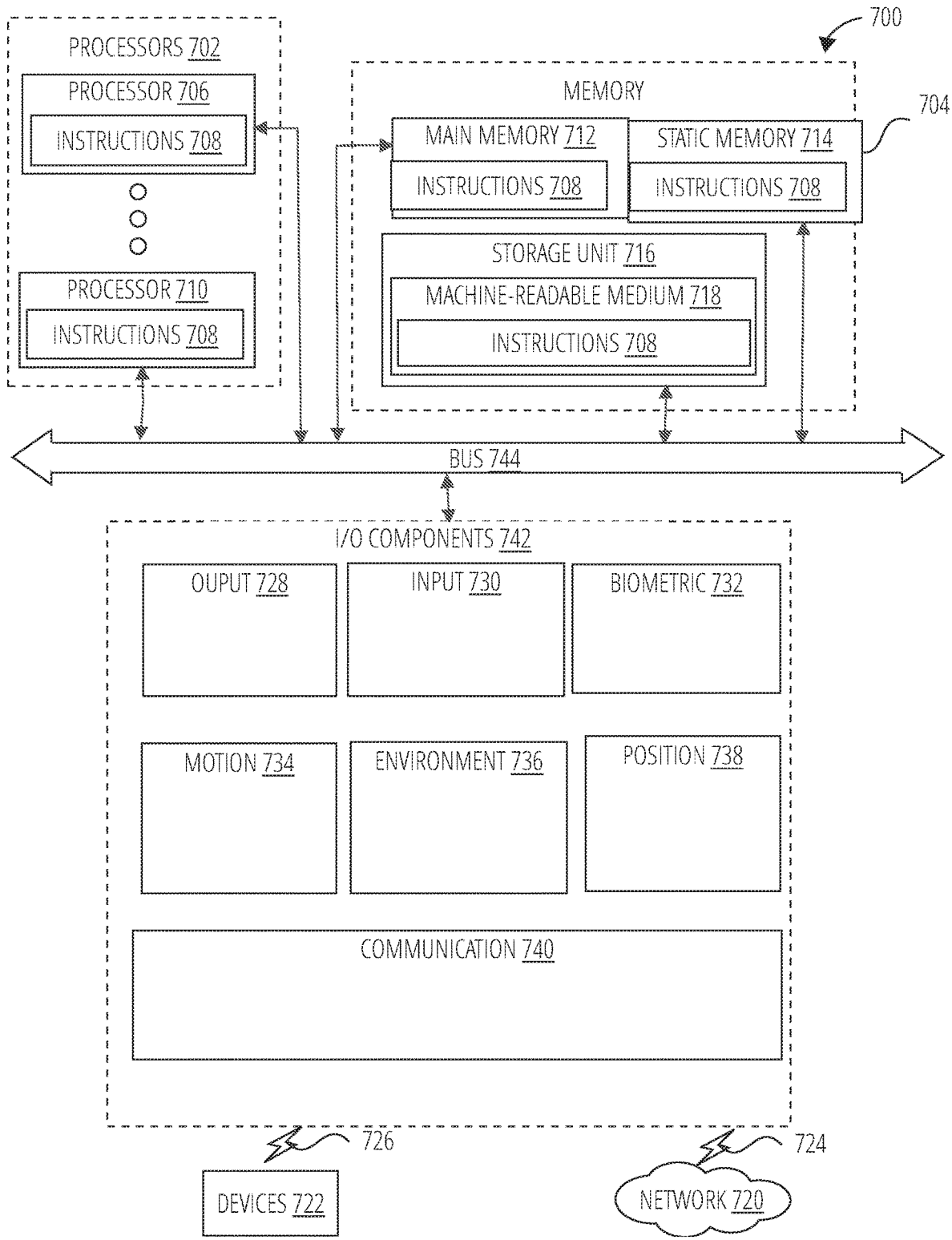
FIG. 7 is block diagram showing a software architecture within which the present disclosure may be implemented, in accordance with some example embodiments.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
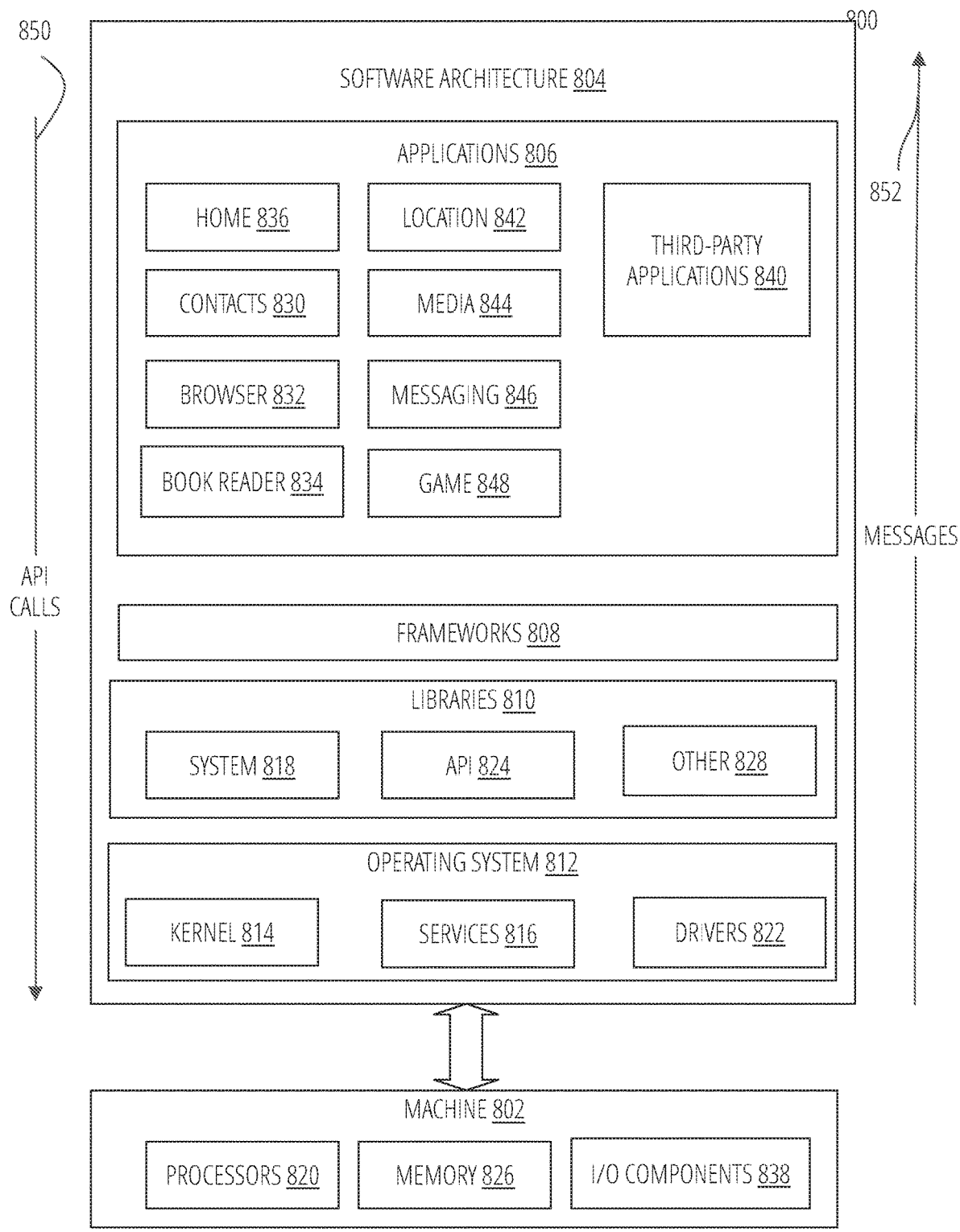
FIG. 8 is a diagrammatic representation of a machine, in the form of a computer system within which a set of instructions may be executed for causing the machine to perform any one or more of the methodologies discussed, in accordance with some example embodiments.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

What is claimed is:

1. A method comprising:
receiving, from a camera, a plurality of images of a hand;
generating a plurality of sets of joint location coordinates by:
for each given image in the plurality of images:
cropping, using one or more processors, a portion of the given image comprising the hand;
identifying, using a neural network, a first set of joint location coordinates in the cropped portion of the given image, wherein the first set of joint location coordinates represent pixel locations of the hand relative to the cropped portion of the given image;
identifying an intermediate set of joint location coordinates, wherein the intermediate set of joint location coordinates represent pixel locations of the hand relative to the given image;
generating a second set of joint location coordinates based on the first set of joint location coordinates and the intermediate set, wherein the second set of joint location coordinates represents joint locations of the hand relative to a three-dimensional physical space; and
identifying a three-dimensional hand pose of the hand based on the plurality of sets of joint location coordinates.

2. The method of claim 1, wherein the plurality of images comprises a plurality of views of the hand.

3. The method of claim 1, further comprising:
prompting a user of a client device to initialize a hand position;
receiving the initialized hand position; and
tracking the hand based on the initialized hand position.

4. The method of claim 1, wherein the camera is a stereo camera.

5. The method of claim 1,
wherein the intermediate set of joint location coordinates is measured relative to an uncropped version of the given image.

6. The method of claim 1, further comprising:
generating a synthetic training dataset comprising stereo image pairs of virtual hands and corresponding ground truth labels, wherein the corresponding ground truth labels comprise joint locations.

7. A system comprising:
a processor; and
a memory storing instructions that, when executed by the processor, configure the system to perform operations comprising:

receiving, from a camera, a plurality of images of a hand;

generating a plurality of sets of joint location coordinates by:

for each given image in the plurality of images:

cropping, using one or more processors, a portion of the given image comprising the hand;

identifying, using a neural network, a first set of joint location coordinates in the cropped portion of the given image, wherein the first set of joint location coordinates represent pixel locations of the hand relative to the cropped portion of the given image;

identifying an intermediate set of joint location coordinates, wherein the intermediate set of joint location coordinates represent pixel locations of the hand relative to the given image;

generating a second set of joint location coordinates based on the first set of joint location coordinates and the intermediate set, wherein the second set of joint location coordinates represents joint locations of the hand relative to a three-dimensional physical space; and identifying a three-dimensional hand pose of the hand based on the plurality of sets of joint location coordinates.

8. The system of claim 7, wherein the plurality of images comprises a plurality of views of the hand.

9. The system of claim 7, further comprising:

prompting a user of a client device to initialize a hand position;

receiving the initialized hand position; and tracking the hand based on the initialized hand position.

10. The system of claim 7, wherein the camera is a stereo camera.

11. The system of claim 7, wherein the intermediate set of joint location coordinates is measured relative to an uncropped version of the given image.

12. The system of claim 7, further comprising:

generating a synthetic training dataset comprising stereo image pairs of virtual hands and corresponding ground truth labels, wherein the corresponding ground truth labels comprise joint locations.

13. A non-transitory computer-readable storage medium, the computer-readable storage medium including instructions that when executed by a computer, cause the computer to perform operations comprising:

receiving, from a camera, a plurality of images of a hand;

generating a plurality of sets of joint location coordinates by:

for each given image in the plurality of images:

cropping, using one or more processors, a portion of the given image comprising the hand;

identifying, using a neural network, a first set of joint location coordinates in the cropped portion of the given image, wherein the first set of joint location coordinates represent pixel locations of the hand relative to the cropped portion of the given image;

identifying an intermediate set of joint location coordinates, wherein the intermediate set of joint location coordinates represent pixel locations of the hand relative to the given image;

generating a second set of joint location coordinates based on the first set of joint location coordinates and the intermediate set, wherein the second set of joint location coordinates represents joint locations of the hand relative to a three-dimensional physical space; and identifying a three-dimensional hand pose of the hand based on the plurality of sets of joint location coordinates.

14. The computer-readable storage medium of claim 13, wherein the plurality of images comprises a plurality of views of the hand.

15. The computer-readable storage medium of claim 13, further comprising:

prompting a user of a client device to initialize a hand position;

receiving the initialized hand position; and tracking the hand based on the initialized hand position.

16. The computer-readable storage medium of claim 13, wherein the second set of joint location coordinates is measured use millimeters.

17. The computer-readable storage medium of claim 13, further comprising:

generating a synthetic training dataset comprising stereo image pairs of virtual hands and corresponding ground truth labels, wherein the corresponding ground truth labels comprise joint locations.

18. The computer-readable storage medium of claim 13, wherein the intermediate set of joint location coordinates is measured relative to an uncropped version of the given image.

* * * * *